US011858108B2

(12) United States Patent
Rejman et al.

(10) Patent No.: US 11,858,108 B2
(45) Date of Patent: Jan. 2, 2024

(54) RECHARGEABLE BATTERY PACK FOR A HAND-HELD POWER TOOL AND METHOD FOR MANUFACTURING A RECHARGEABLE BATTERY PACK FOR A HAND-HELD POWER TOOL

(71) Applicant: Robert Bosch GmbH, Stuttgart (DE)

(72) Inventors: Marcin Rejman, Waiblingen (DE); Thorsten Seidel, Remseck (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/830,590

(22) Filed: Jun. 2, 2022

(65) Prior Publication Data

US 2022/0294054 A1    Sep. 15, 2022

Related U.S. Application Data

(62) Division of application No. 15/554,480, filed as application No. PCT/EP2016/054501 on Mar. 3, 2016, now abandoned.

(30) Foreign Application Priority Data

Mar. 6, 2015    (DE) ...................... 10 2015 204 049.6
Mar. 2, 2016    (DE) ...................... 10 2016 203 431.6

(51) Int. Cl.
*B25F 5/02*      (2006.01)
*H01M 50/24*    (2021.01)
(Continued)

(52) U.S. Cl.
CPC ............. *B25F 5/02* (2013.01); *H01M 50/213* (2021.01); *H01M 50/227* (2021.01);
(Continued)

(58) Field of Classification Search
CPC ....................................................... B25F 5/02
See application file for complete search history.

(56) References Cited

U.S. PATENT DOCUMENTS

| 2013/0183566 A1 | 7/2013  | Wayne et al. |
| 2014/0377622 A1 | 12/2014 | Glauning     |
| 2015/0249237 A1 | 9/2015  | Naito        |

FOREIGN PATENT DOCUMENTS

| CN | 103048801    A  | 4/2013 |
| DE | 102004043828 A1 | 3/2006 |

(Continued)

OTHER PUBLICATIONS

International Search Report for PCT/EP2016/054501, dated May 11, 2016.

(Continued)

*Primary Examiner* — Adam A Arciero
(74) *Attorney, Agent, or Firm* — NORTON ROSE FULBRIGHT US LLP; Gerard Messina

(57) ABSTRACT

A rechargeable battery pack for a hand-held power tool, including a housing having at least first and second housing components, the pack including at least one cell holder, accommodating at least two battery cells in a parallel/series circuit, the battery cells each including two end faces extending perpendicularly to a longitudinal axis; and a pack electronics system including contact elements for establishing electrical connection between the pack and a power tool. The cell holder includes sleeve-like insulating walls, corresponding to the battery cells at least in some areas, to prevent electrical contact between the battery cells. A method for manufacturing a pack for a hand-held power tool, the cell holder including sleeve-like insulating walls, having cylindrical cell openings for accommodating the battery cells, the battery cells being pressed into the cell openings so that a (Continued)

form-locked and force-fit connection is established between the cell holder and the battery cells.

24 Claims, 4 Drawing Sheets

(51) Int. Cl.
*H01M 50/213* (2021.01)
*H01M 50/502* (2021.01)
*H01M 50/264* (2021.01)
*H01M 50/244* (2021.01)
*H01M 50/247* (2021.01)
*H01M 50/227* (2021.01)

(52) U.S. Cl.
CPC ......... *H01M 50/24* (2021.01); *H01M 50/244* (2021.01); *H01M 50/247* (2021.01); *H01M 50/264* (2021.01); *H01M 50/502* (2021.01); *H01M 2220/30* (2013.01); *H01M 2250/30* (2013.01); *Y02B 90/10* (2013.01)

(56) References Cited

FOREIGN PATENT DOCUMENTS

| | | |
|---|---|---|
| DE | 102013211459 A1 | 12/2014 |
| EP | 2223782 A2 | 9/2010 |
| EP | 2787559 A1 | 10/2014 |
| JP | 2008091233 A | 4/2008 |
| JP | 2011146151 A | 7/2011 |

OTHER PUBLICATIONS

Kishida, Battery Pack, 2010, machine translation, Japan Platform for Patent Information (Year: 2010).

Kishida, Battery Pack, 2011, Japan Platform for Patent Information machine translation (Year: 2011).

RECHARGEABLE BATTERY PACK FOR A HAND-HELD POWER TOOL AND METHOD FOR MANUFACTURING A RECHARGEABLE BATTERY PACK FOR A HAND-HELD POWER TOOL

CROSS REFERENCE

The present application is a divisional application of U.S. application Ser. No. 15/554,480, filed Aug. 30, 2017, which is a U.S. National Phase of International Application No. PCT/EP2016/054501, filed Mar. 3, 2016, which claims the benefit under 35 U.S.C. § 119 of German Patent Application No. DE 10 2016 203 431.6, filed on Mar. 2, 2016, and German Patent Application No. DE 10 2015 204 049.6, filed on Mar. 6, 2015, which are all expressly incorporated herein by reference in their entireties.

FIELD OF THE INVENTION

The present invention relates to a rechargeable battery pack for a hand-held power tool and to a method for manufacturing a rechargeable battery pack for a hand-held power tool.

BACKGROUND INFORMATION

Since rechargeable battery units allow for a great deal of flexibility while working and, in particular, are independent of mains-supplied power, and outside work may therefore also be conveniently carried out, it is often provided to utilize rechargeable battery packs during an operation of a hand-held power tool.

Such rechargeable battery packs are known, in principle, and include rechargeable accumulators, generally a plurality of battery cells connected in a parallel and/or series circuit. As part of this application, a rechargeable battery pack is therefore to be understood to be an accumulator pack which may be made up of several electrically interconnected battery cells, may store electrical energy and delivers the energy for the operation of the hand-held power tool, and is exchangeably accommodated in a chamber, an interface, or the like of the hand-held power tool. The rechargeable battery pack is assigned to the hand-held power tool by plugging or inserting the rechargeable battery pack into a complementary plug-in socket of the unit housing, the rechargeable battery pack being coupleable to the unit housing of the hand-held power tool in such a way that the power tool is electrically coupled and mechanically locked to the rechargeable battery pack upon the coupling of the two housings. The electrical contacting takes place mostly in the area of the locking device.

With respect to the rechargeable battery packs, it proves to be disadvantageous that waste heat is generated in every battery cell both during current delivery and during current draw, which may result in an elevated temperature of the entire rechargeable battery block. In order to avoid damage to the battery cell and/or the rechargeable battery block, waste heat must be reliably dissipated, on the one hand and, on the other hand, temperature control of the rechargeable battery pack must be possible at outside temperatures which are too low, which is advantageous, in particular, in the case of cells which are chemically based on lithium.

In order to accommodate several battery cells which are interconnected in a parallel or series circuit, the battery cells in the rechargeable battery packs are fixed directly within the rechargeable battery housing or are positioned without being fixed. If fixing does not take place, cardboard sleeves may be utilized for insulating the cells with respect to one another. Hand-held power tools, in particular cordless drills, generate substantial vibrations during operation. These vibrations are transmitted via the housing to the rechargeable battery housing and, from there, to battery cells present in the rechargeable battery housing. Such a vibration of the rechargeable battery pack is disadvantageous for the service life of the rechargeable battery pack, in particular for the service life of the battery cells and the electrical contactings.

In this way, it is generally provided to connect the battery cells to each other in series or to connect the battery cell blocks to each other in series. Mechanical installation principles for this purpose are known from the related art, which combine elastic inserts such as elastomer cores or clamping wedges with force-fit connecting elements such as screws or snap-action elements in order to build up a high contact pressure between the outer cell wall and the inner housing wall. This is technically highly complex. Furthermore, it proves to be disadvantageous that the connection of the battery cell in the cell holder takes place only indirectly, whereby disadvantages result with respect to the mechanical robustness of the cell holder.

Moreover, it is believed from the related art to fill the air gaps in the cell holder with a casting compound. The relatively great amount of installation effort, in turn, is disadvantageous in this case. Furthermore, the casting compound may reach the cell poles, which results in a detraction from the operational reliability of the rechargeable battery pack.

SUMMARY OF THE INVENTION

An object of the present invention is to avoid the aforementioned disadvantages and to provide a rechargeable battery pack for a hand-held power tool and to provide a method for manufacturing a rechargeable battery pack for a hand-held power tool, in which the aforementioned disadvantages are improved. In this case, the rechargeable battery pack is to have good ergonomics and installability and to be cost-effective and simply configured, on the one hand, and, on the other hand, to allow for a reliable dissipation of generated waste heat.

This object may be achieved by a rechargeable battery pack as described herein and by a method for manufacturing a rechargeable battery pack for a hand-held power tool as described herein. Advantageous embodiments, variants, and refinements of the present invention are provided in the further descriptions herein.

According to the present invention, it is provided that a hand-held power tool includes a rechargeable battery pack housing, the rechargeable battery pack housing including at least one first housing component and a second housing component. The rechargeable battery pack further includes at least one cell holder, the cell holder accommodating at least two battery cells which are interconnected in a parallel and/or series circuit, the battery cells each including two end faces extending perpendicularly to a longitudinal axis. Moreover, the rechargeable battery pack housing includes a rechargeable battery pack electronics system including contact elements for establishing an electrical connection between the rechargeable battery pack and the hand-held power tool. According to the present invention, it is provided that the cell holder includes sleeve-like insulating walls corresponding to the battery cells at least in some areas, the insulating walls being configured in such a way that an electrical contacting between the battery cells is prevented.

Advantageously, the cell holder has a cell opening, which is cylindrical, for each battery cell, in particular, and is intended for accommodating a battery cell, the insulating walls being situated between the cell openings. In particular, each battery cell is surrounded by a sleeve-like insulating wall. The battery cells are, in particular, cylindrical battery cells. In particular, each battery cell is surrounded by a sleeve-like insulating wall over its entire lateral surface. The cell holder may be made up of an injection-molded part, in particular, which includes corresponding receptacles for the battery cells, so that these are held in the cell holder, spaced apart from each other. In this way, short circuits are prevented from occurring due to the individual battery cells contacting each other. Furthermore, it is provided that the cell holder is at least partially made up of a material which is thermoconducting and electrically insulating, so that heat generated by the battery cells may be better dissipated.

In one specific embodiment, a diameter D1 of the cell openings before the battery cells are inserted into the cell openings is between 97% and 99%, in particular between 97.5% and 98.5% of a diameter D2 of the corresponding battery cells. Advantageously, a diameter D1 of the cell openings before the battery cells are inserted into the cell openings is between 0.05 mm and 0.20 mm, in particular between 0.10 mm and 0.15 mm less than a diameter D2 of the corresponding battery cells. In this way, after the battery cells have been pressed in, the cell holder rests on the battery cells in the area of the cell openings in an essentially gap-free manner, so that, in addition to a secure accommodation of the battery cells in the cell holder, good heat dissipation of the heat generated during the operation of the battery pack away from the battery cells may be achieved. After the pressing-fit, the cell holder rests on the battery cells in the area of the cell openings in an essentially gap-free manner in such a way that essentially no air is present between the cell holder and the battery cells. The pressing-fit prevents insulating air gaps between the cell holder and the battery cells in the area of the cell openings.

The battery cells may be pressed into the cell holder. In particular, each battery cell is pressed into its assigned cell opening. Due to the pressing-fit, a cell holding force of the cell holder acts on the battery cells in the cell openings. A cell holding force acts between the cell holder and the accommodated battery cells, the cell holding force being between 20 N and 400 N, in particular between 100 N and 300 N, particularly between 150 N and 250 N. This allows for a form- and force-fit connection of the battery cells to the cell holder. The frictional connection prevents a movement of the battery cells relative to the cell holder and relative to the rechargeable battery pack housing.

According to the present invention, it is provided that the cell holder has free areas in the area of the end faces of the battery cells, in which the electrical connection of the battery cells to each other takes place via cell connectors. In particular, the cell holder is open in the area of the end faces of the battery cells. The cell holder is therefore open in the area of the two poles of each battery cell. In this case, it is particularly advantageous when the cell connectors are connected to the battery cells via a welded joint and the cell connectors are connected to the rechargeable battery pack electronics via a soldered joint. As a result, a particularly simple mechanical and electrical contacting is achieved, and such connections are also particularly secure connections. Furthermore, a tolerance compensation and a thermal expansion compensation may also be achieved with the aid of an appropriately configured welded joint.

The cell holder may include, in the area of the cell openings, stops which correspond to the battery cells and ensure a desired position of the battery cells in the cell holder. In this case, it is possible that these stops are located only on one side of the cell holder or, for example, always on the negative pole side or the positive pole side of the pressed-in battery cells. In principle, these stops make it easier to correctly press the battery cells into the cell holder.

In order to ensure an optimal dissipation of the generated heat, the cell holder in one particularly specific embodiment forms an outer side of the rechargeable battery pack housing, at least in some areas. This allows for greater thermal conductivity than is the case with rechargeable battery packs having an additional outer side, and it is space-saving and also reduces the material costs. It is particularly advantageous when the battery cells have no insulating sheathing, at least in some areas. In this way, the pressing-fit of the battery cells into the cell holder may be facilitated, on the one hand, and better thermal conductivity may be ensured, on the other hand.

The rechargeable battery pack according to the present invention may be detachably connected to a hand-held power tool.

Therefore, a hand-held power tool, provided it is connected to a rechargeable battery pack according to the present invention, is a further subject matter of the present invention. The rechargeable battery pack inserted in the hand-held power tool is used in this case for driving the hand-held power tool.

Moreover, the object is achieved by a method for manufacturing a rechargeable battery pack for a hand-held power tool. According to the present invention, it is provided that the rechargeable battery pack includes a cell holder and at least two battery cells, the battery cells being electrically connected to each other via corresponding cell connectors in a parallel and/or series circuit. The cell holder includes sleeve-like insulating walls, between which cylindrical cell openings for accommodating the battery cells are located, the battery cells being pressed into the cell openings in such a way that a form-locked and force-fit connection is established between the cell holder and the battery cells.

In the provided method, elastic and/or plastic material expansions occur in the area of the cell holder. In order to ensure a damage-free insertion of the battery cells into the cell openings, the cell holder is made up of a plastic material, which may be a thermoplastic polymer, a thermosetting plastic, or an elastomer, particularly a polyethylene, which may be a polyethylene having a density between 0.90 g/cm$^3$ and 1.0 g/cm$^3$, which may be between 0.95 g/cm$^3$ and 0.99 g/cm$^3$, particularly between 0.96 g/cm$^3$ and 0.98 g/cm$^3$ being used.

In order to avoid insulating air gaps between the cell holder and the battery cells, it is provided according to a further embodiment of the present invention that, after the battery cells have been pressed in, the cell holder rests against the battery cells in the area of the cell openings in an essentially gap-free manner. In order to achieve this, a diameter D1 of the cell openings before the battery cells are pressed into the cell openings is advantageously between 97% and 99%, in particular between 97.5% and 98.5% of a diameter D2 of the corresponding battery cells. Alternatively, a diameter D1 of the cell openings before the battery cells are pressed into the cell openings is between 0.05 mm and 0.20 mm, in particular between 0.10 mm and 0.15 mm less than a diameter D2 of the corresponding battery cells. Alternatively, a seat which is gap-free in this way may also be achieved when a circumference of the cell openings before the battery cells are inserted into the cell openings is 97% to 99.5% of a circumference of the cell casing, which may be 98% to 99%.

Advantageously, the cell holder is preheated before the press-fit process, which may be to a temperature between 60° C. and 90° C., in particular between 70° C. and 80° C. In this way, the press-fit process may be carried out more efficiently and be gentler on the material. This has the advantage, on the one hand, that thermal expansions set in, which anticipate a part of the necessary deformations occurring during the press-fit; on the other hand, the deformability of the thermoplastic polymers increases as the temperature increases, which is advantageous for the manufacturing process.

In this case, it is particularly advantageous that a material expansion occurring in the cell holder after the battery cells have been pressed in is between 0.2% and 5%, in particular between 0.5% and 3%, particularly between 1% and 2%. As a result, a sufficiently high cell holding force for fixing the battery cells in the cell carrier is mobilized. In one specific embodiment of the present invention, this cell holding force between the cell holder and the pressed-in battery cells is between 20 N and 400 N, in particular between 100 N and 300 N, particularly between 150 N and 250 N.

Furthermore, lithium ion cells, in particular, may be utilized as battery cells, since it is possible in the case of lithium cells in particular to combine several battery cells to form battery cell blocks in which several battery cells are connected in a parallel circuit. In this case, it is particularly advantageous that the cell holder may accommodate battery cells having different diameters and lengths, whereby the application of the cell holder or the cell carrier in different rechargeable battery packs may be ensured.

The state of charge, inter alia, may be monitored and controlled via the voltage of the individual battery cells with the aid of a rechargeable battery pack electronics system. Alternatively, a monitoring of individual cells may take place, individual battery cells being connectable directly to the circuit board of the rechargeable battery pack electronics system with the aid of contact arrangement. Such a connection may take place, for example, with the aid of a soldered joint, the rechargeable battery pack electronics system advantageously being able to include appropriate soldering pads. It may therefore be established, on the basis of the connection between the battery cells and the rechargeable battery pack electronics system, whether all battery cells are being charged according to the directions or whether a charging amperage, which the battery cells are unable to handle, has possibly been reached. In addition, a regulation may be provided, with the aid of which the charging amperage is regulated in such a way that an overload of individual battery cells is prevented, on the one hand, and all battery cells may be completely charged, on the other hand. In this way, a good usability of the corresponding rechargeable battery pack is achieved over a long period of time. In addition, the rechargeable battery pack electronics system may also include a number of further electronics elements for the control, regulation, or identification of the rechargeable battery pack. Furthermore, further components such as, in particular, switches, but also charge level indicators and/or overload protection may be connected to the rechargeable battery pack electronics system.

With the aid of the described optimized embodiment of the rechargeable battery pack according to the present invention, many functions within the rechargeable battery pack are improved, so that the cell holder may, for example, perform the function of an installation platform and accommodate and fix the internal components of the rechargeable battery pack. In this way, the installation process may be optimized for the rechargeable battery pack, and additional components such as, for example, adhesive films, cardboard sleeves, or insulating layers, may be dispensed with. Moreover, different specific embodiments of a cell holder may be utilized in one rechargeable battery pack, so that battery cells having different diameters and lengths may be accommodated and an application of the cell holder or the cell carrier in different rechargeable battery packs may be ensured.

In general, a hand-held power tool within the scope of the application is understood to be all hand-held power tools including a tool carrier, which may be set into rotation or translation and which is directly drivable by a drive motor via a gear or a planetary gear set, such as, for example, baton screw drivers, cordless drills, percussion power drills, multi-function tools, saws, shears, grinders, and/or combi drills. In this context, "transmission of electrical energy" is to be understood, in particular, to mean that the hand-held power tool is supplied with energy via the rechargeable battery pack.

Further features, possible applications, and advantages of the present invention result from the following description of exemplary embodiments of the present invention, which are represented in the figures. It should be noted that the represented features merely have descriptive character and may also be used in combination with features of other above-described refinements and are not intended to restrict the present invention in any way.

The present invention is explained in greater detail in the following with reference to the exemplary embodiments, identical reference numerals being used for identical features. The drawings are schematic.

DETAILED DESCRIPTION

Figure 1:
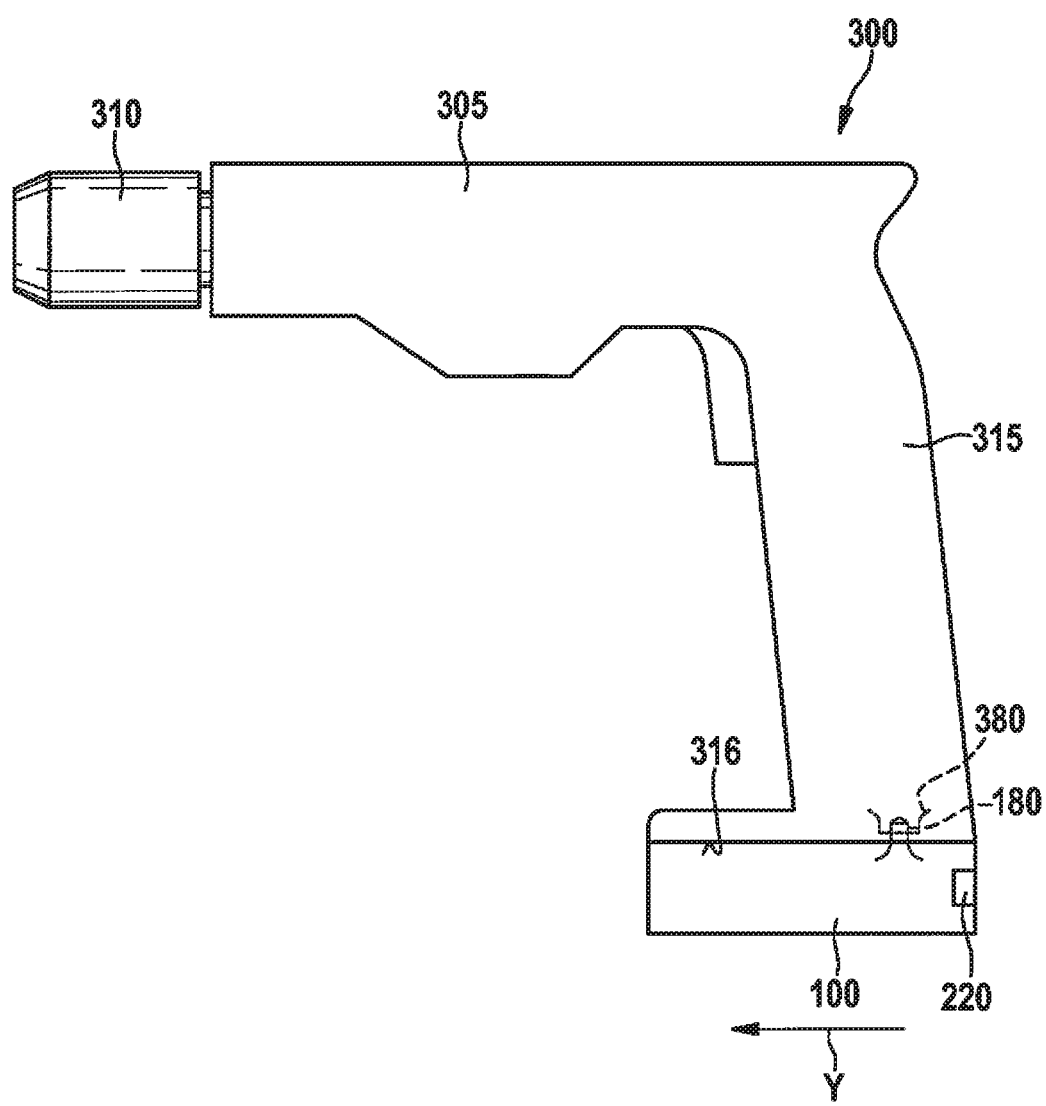
FIG. 1 shows a view of a hand-held power tool including a rechargeable battery pack according to the present invention, by way of example.
Figure 2:
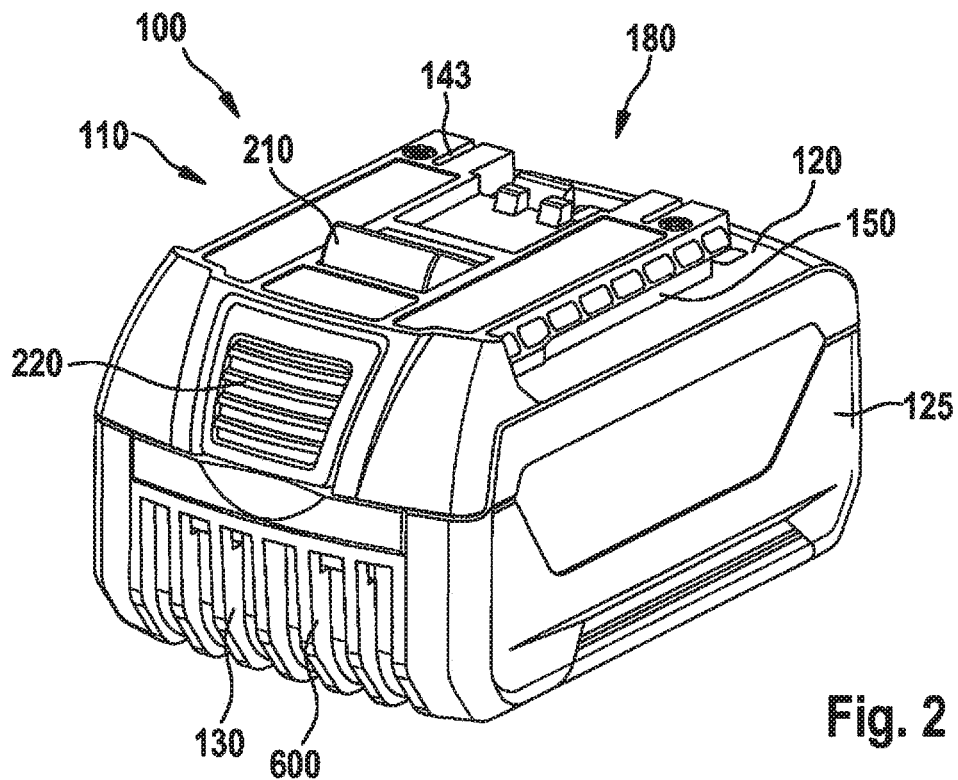
FIG. 2 shows a perspective representation of a rechargeable battery pack according to the present invention.

FIG. 1 shows an electrical device which is configured as a hand-held power tool 300. According to the represented specific embodiment, hand-held power tool 300 is mechanically and electrically connectable to rechargeable battery pack 100 for battery-supplied power. In FIG. 1, hand-held power tool 300 is configured as a cordless combi drill, by way of example. It is pointed out, however, that the present invention is not restricted to cordless combi drills, but rather may be utilized with different hand-held power tools 300 which are operated with the aid of a rechargeable battery pack 100. Hand-held power tool 300 includes a base body 305, on which a tool holder 310 is fastened, and includes a handle 315 which includes an interface 380 at which a corresponding interface 180 of a rechargeable battery pack 100 according to the present invention is situated, in the locked position in this case. Rechargeable battery pack 100 is configured as a sliding rechargeable battery pack.

During the mounting of rechargeable battery pack 100 on hand-held power tool 300, receiving arrangement provided on hand-held power tool 300, for example, guide grooves and guide ribs, are brought into engagement with corresponding guide elements 150 of rechargeable battery pack 100, rechargeable battery pack 100 being inserted in a sliding direction y along the receiving arrangement of handle 315 and rechargeable battery pack 100 is pushed along a lower outer surface 316 of handle 315, which is oriented essentially perpendicularly to the longitudinal direction of handle 315, into the rechargeable battery pack receptacle of a hand-held power tool 300. In the position shown in FIG. 1, rechargeable battery pack 100 is fastened on handle 315 of hand-held power tool 300 and is locked with the aid of locking arrangement. The locking arrangement includes a locking element and an actuating element 220. By way of the actuation of actuating arrangement 220, rechargeable battery pack 100 may be released from handle 315 of hand-held power tool 300.

FIGS. 2 through 5 show a rechargeable battery pack 100 according to the present invention for a hand-held power tool 300. This includes a rechargeable battery pack housing 110 made up of a first housing component 120 and a second housing component 130, the housing accommodating, between first housing component 120 and second housing component 130, at least one battery cell, which may be a plurality of battery cells 400, as represented here, which are interconnected in parallel or in series. Battery cells 400 may be positioned and held in rechargeable battery pack housing 110 with the aid of a cell holder 600 for insulating battery cells 400 with respect to each other. In addition, battery cells 400 may be provided with an insulating sheathing 430, which is known per se from the related art, for the insulation with respect to each other. Cardboard sleeves or plastic sleeves, for example, shrinkable tubing, may be provided as insulating sheathing 430. Insulating sheathing 430 is described further below in conjunction with FIG. 6. In the shown embodiment variant rechargeable battery pack 100 is configured as a sliding rechargeable battery pack.

For the releasable mounting of rechargeable battery pack 100 on a hand-held power tool 300 or on a charging device, rechargeable battery pack 100 includes an interface 180 for the releasable mechanical and electrical connection to a corresponding interface 380 of hand-held power tool 300 or a corresponding interface of the charging device. During the mounting of rechargeable battery pack 100, receiving arrangement, for example, guide grooves and guide ribs, of hand-held power tool 300 or of the charging device are brought into engagement with rechargeable battery pack 100 in order to accommodate the corresponding guide elements of rechargeable battery pack 100, rechargeable battery pack 100 being inserted along the receiving arrangement in a contacting direction y, and interface 180 of rechargeable battery pack 100 being pushed into corresponding interface 380 of hand-held power tool 300 or the corresponding interface of the charging device. Rechargeable battery pack 100 may be assigned to hand-held power tool 300 and/or the charging device via interfaces 180, 380.

In order to lock rechargeable battery pack 100 on handle 315, rechargeable battery pack 100 is pushed in a sliding direction y along handle 315, in particular along a lower outer surface of handle 315, which is oriented essentially perpendicularly to the longitudinal direction of handle 315. In the position shown in FIG. 1, rechargeable battery pack 100 is locked on handle 315 with the aid of locking arrangement 200. Locking arrangement 200 include, inter alia, a locking element 210, which is indicated only schematically, and an actuating element 220. By way of the actuation of actuating element 220, rechargeable battery pack 100 may be released from handle 315 of hand-held power tool 300. After rechargeable battery pack 100 is unlocked, it may be separated from handle 315, in particular by sliding rechargeable battery pack 100 counter to sliding direction y along a lower surface of handle 315. During the mounting of rechargeable battery pack 100 on a hand-held power tool 300, locking element 210 is brought into engagement with a corresponding receptacle—which is not shown in greater detail—in handle 315 of hand-held power tool 300.

Figure 3:
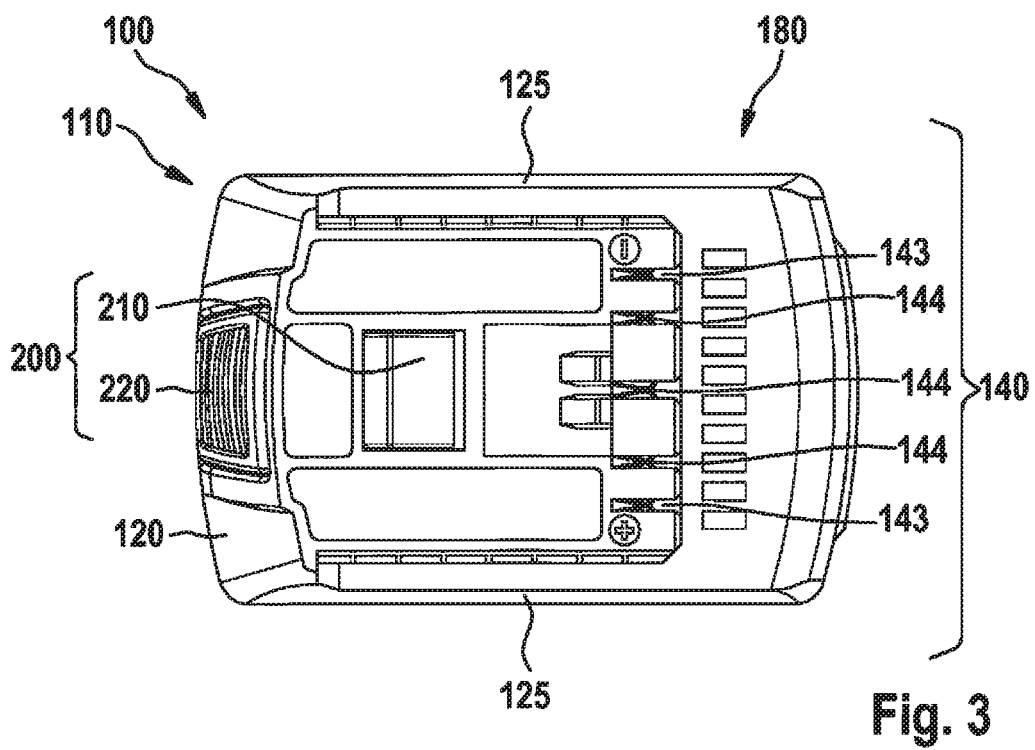
FIG. 3 shows a top view of the rechargeable battery pack from FIG. 2.

As is apparent in FIG. 3, interface 180 also includes contact elements 140 for electrical contacting of rechargeable battery pack 100 to hand-held power tool 300 or the charging device. Contact elements 143 are configured as voltage contact elements and are used as charging and/or discharging contact elements. Contact elements 144 are configured as signal contact elements and are used for the transmission of signals from rechargeable battery pack 100 to hand-held power tool 300 or the charging device and/or from hand-held power tool 300 or the charging device to rechargeable battery pack 100.

Figure 4:
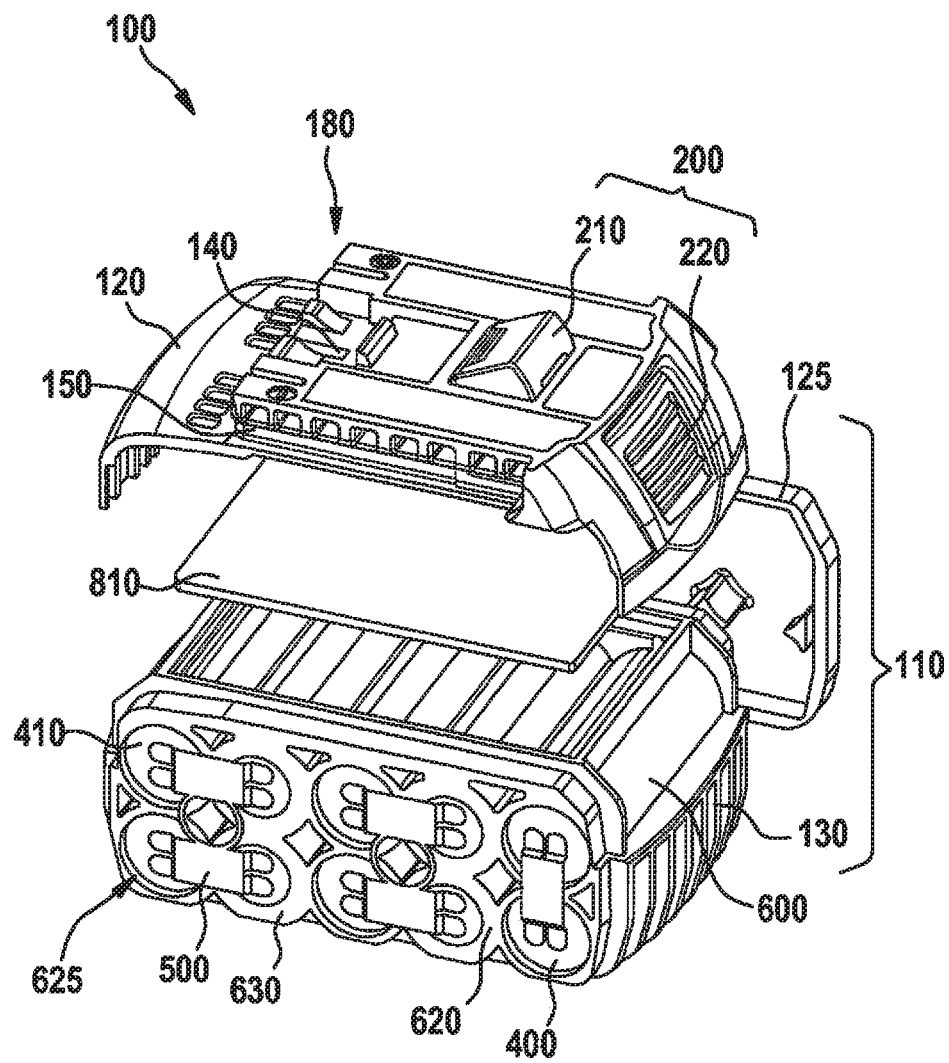
FIG. 4 shows a perspective exploded representation of a rechargeable battery pack according to the present invention.

FIG. 4 shows a rechargeable battery pack 100 in an exploded view. In this case, it is clearly apparent that rechargeable battery pack housing 110 includes a cell holder 600 which includes a plurality of battery cells 400 interconnected in a series circuit, second housing component 130 directly forming cell holder 600. Cell holder 600 simultaneously forms second housing component 130. The connection of battery cells 400 to each other is implemented via cell connectors 500. Furthermore, it is apparent that individual battery cells 400 are accommodated spaced apart from each other in order to be mechanically fixed in cell holder 600. Cell holder 600 is used not only for fixing battery cells 400 in rechargeable battery pack housing 110 or in second housing component 130, but also for cooling battery cells 400 and is made up of a thermally conductive material, for example aluminum or a plastic. Moreover, cell holder 600 includes sleeve-like insulating walls 620, so that individual battery cells 400 are separated and an electrical insulation of individual battery cells 400 from each other may be ensured. The heat transmission resistance between adjacent battery cells 400 and between battery cells 400 and cell holder 600 may be low in this case, so that the waste heat generated by battery cells 400 may be well dissipated to the outside and an overheating of rechargeable battery pack 100 in the interior may be prevented. A circuit board 810 of a rechargeable battery pack electronics system is fastened on the surface of cell holder 600, within rechargeable battery pack housing 110. Furthermore, the rechargeable battery pack electronics system includes contact elements 140 for establishing the electrical and mechanical connection between rechargeable battery pack 100 and hand-held power tool 300 or between rechargeable battery pack 100 and the charging device. The connection between the rechargeable battery pack electronics system and cell holder 600 is ensured by way of fastening elements which are not shown in greater detail.

In the specific embodiment represented in FIG. 4, rechargeable battery pack housing 110 further includes two lateral components 125, only one of the two lateral components 125 being represented in FIG. 4. In the assembled state, lateral components 125 hold first housing component 120 and second housing component 130 together in such a way that a detachment of first housing component 120 from second housing component 130, or vice versa, is prevented. Alternative installation and fastening principles of the housing components of rechargeable battery pack housing 110 are possible. In the specific embodiment represented, it is clearly apparent that cell holder 600 forms, in areas, an outer side of second housing component 130 or of rechargeable battery pack 100, cell holder 600 alternatively also being able to form, in areas, an outer side of first housing component 120. As is described in greater detail further below, cell holder 600 essentially completely encompasses lateral surfaces 405 of battery cells 400. In this case, essentially only end faces 410 of battery cells 400 are exposed, as is apparent in FIGS. 4 and 5. Lateral components 125 form an outer side of rechargeable battery pack 100 in the area of end faces 410.

Cell holder 600 includes sleeve-like insulating walls 620, between which cylindrical cell openings 625 for accommodating battery cells 400 are located. Battery cells 400 are pressed into cell openings 625 in such a way that a form-locked and force-fit connection is established between cell holder 600 and battery cells 400. In this way, an electrical insulation of battery cells 400 with respect to each other is achieved. After battery cells 400 have been pressed in, cell holder 600 rests on battery cells 400 in the area of cell openings 625 in an essentially gap-free manner. In addition to a secure accommodation of battery cells 400 in cell holder 600, good heat dissipation of the heat generated during the operation of battery pack 100 away from battery cells 400 may be achieved in this way.

In order to achieve what may be a gap-free fit of battery cells 400 in cell holder 600, a diameter D1 of cell openings 625 may be selected in such a way that diameter D1 before battery cells 400 are pressed into cell openings 625 is between 97% and 99%, in particular between 97.5% and 98.5% of a diameter D2 of corresponding battery cells 400. A gap-free fit of battery cells 400 in cell holder 600 being achievable, on the one hand, when a diameter D1 is selected for cell openings 625 in such a way that diameter D1 of cell openings 625 before battery cells 400 are pressed into cell openings 625 is between 0.05 mm and 0.20 mm, in particular between 0.10 mm and 0.15 mm less than a diameter D2 of corresponding battery cells 400 and, on the other hand, the gap-free fit may be achieved when a circumference of cell openings 625 before battery cells 400 are inserted into cell openings 625 is between 97% to 99.5% of a circumference of the cell casing, which may be between 98% to 99%. In the provided method, elastic and/or plastic material expansions therefore occur in the area of cell holder 600. An adequate material for cell carrier 600 must be selected in order to ensure a damage-free insertion of battery cells 400 into cell openings 625. Cell holder 600 is made up of a plastic material, alternatively a thermoplastic polymer, a thermosetting plastic, or an elastomer, in particular a polyethylene also being usable. In this case, the polyethylene has a density between 0.90 g/cm$^3$ and 1.0 g/cm$^3$, which may be between 0.95 g/cm$^3$ and 0.99 g/cm$^3$, particularly between 0.96 g/cm$^3$ and 0.98 g/cm$^3$.

In order to make the press-fit process to be more efficient and gentler on the material, cell holder 600 is preheated before the press-fit process to a temperature between 60° C. and 110° C., in particular between 70° C. and 80° C. This has the advantage, on the one hand, that thermal expansions set in, which anticipate a part of the necessary deformations occurring during the press-fit; on the other hand, the deformability of the thermoplastic polymers increases as the temperature increases, which is advantageous for the manufacturing process. The material expansion occurring in cell holder 600 after battery cells 400 have been pressed in is between 0.2% and 5%, in particular between 0.5% and 3%, particularly between 1% and 2%. As a result, a sufficiently high cell holding force for fixing battery cells 400 in cell carrier 600 is mobilized. This cell holding force between cell holder 600 and pressed-in battery cells 400 is between 20 N and 400 N, in particular between 100 N and 300 N, particularly between 150 N and 250 N.

Furthermore, cell connectors 500 are represented in FIG. 4, with the aid of which an electrical interconnection of battery cells 400 to each other in a parallel and/or series circuit may be implemented.

Figure 5:
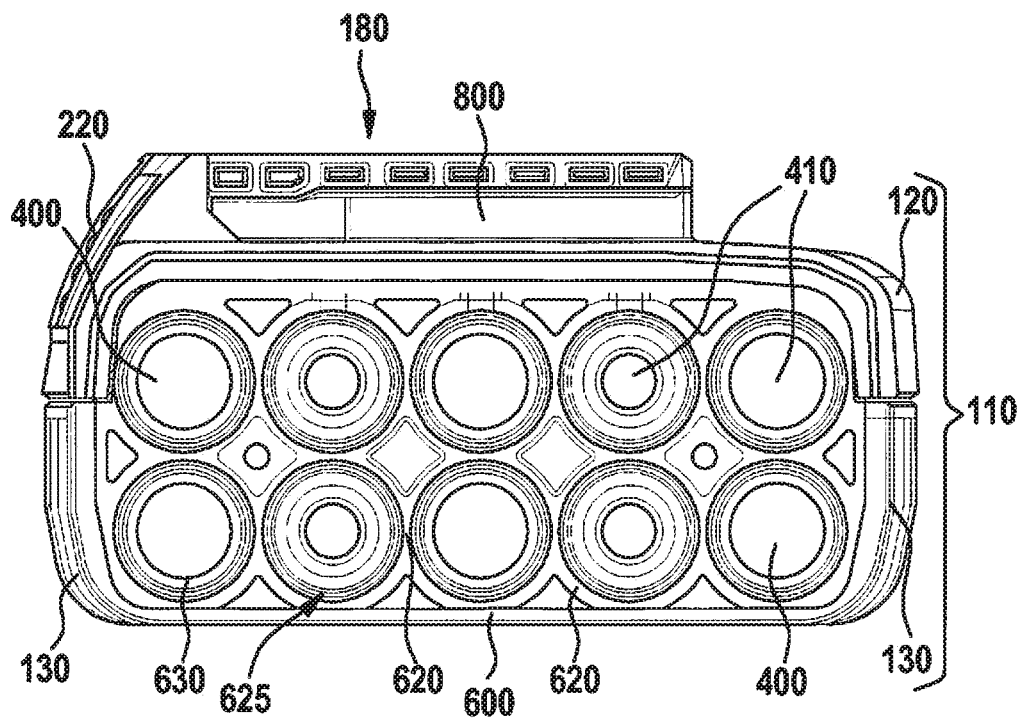
FIG. 5 shows a sectional view of the rechargeable battery pack from FIG. 4.

FIG. 5 is a sectional view of rechargeable battery pack 100 according to the present invention, it also being apparent here that cell holder 600 forms second housing component 130 and, therefore, also an outer side of rechargeable battery pack housing 110. Moreover, it may be gathered from FIG. 5 that lateral surfaces 405 of two battery cells 400 situated next to each other in cell holder 600 do not contact each other, but rather are mechanically and electrically separated from each other by sleeve-like insulating walls 620. It is also clear from FIG. 5, as it is from FIG. 4, that cell holder 600 includes, in the area of cell openings 625, stops 630 which correspond to battery cells 400 and ensure a desired position of battery cells 400 in cell holder 600. Stops 630 ensure a desired position of battery cells 400 in cell holder 600 along longitudinal axis x of battery cells 400. Due to the fact that stops 630 ensure the position of battery cells 400 in cell holder 600, they make it easier to correctly press the battery cells into the cell holder.

Figure 6:
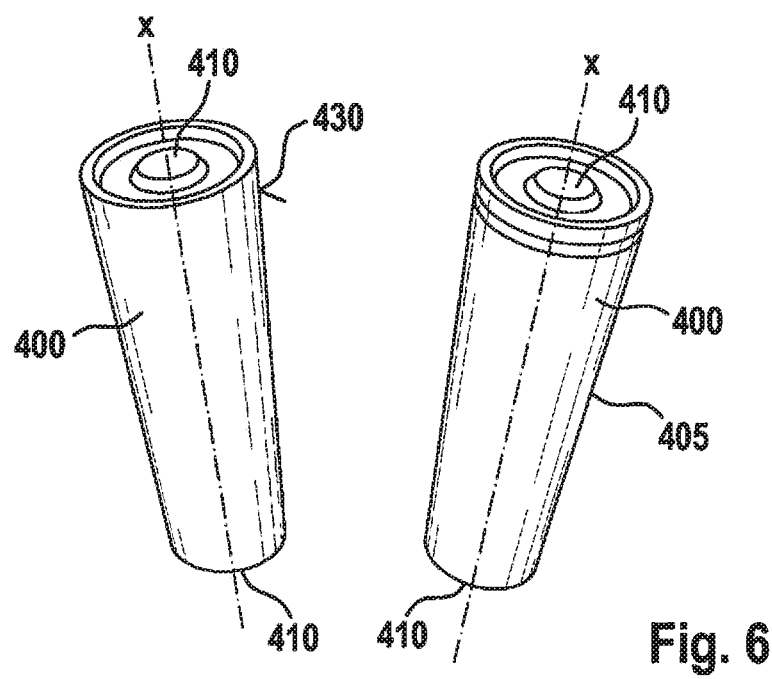
FIG. 6 shows a perspective view of two battery cells.

FIG. 6 shows, on the left side, a cylindrical battery cell 400 including an insulating sheathing 430, which is known per se from the related art, and, on the right side, a cylindrical battery cell 400 without an insulating sheathing 430, battery cells 400 each including a lateral surface 405 which extends in parallel to a longitudinal axis x and is limited by two end faces 410 situated perpendicularly to longitudinal axis x. Lateral surface 405 and end faces 410 form an outer shell of battery cell 400. The electrical poles of battery cells 400 for the electrical contacting are located on end faces 410. The outer shell of battery cells 400 is made up of an electrically conductive material, in particular a metal, which may be aluminum. Insulating sheathing 430 essentially completely surrounds at least lateral surface 405.

End faces 410, in particular the poles at end faces 410, are exposed in order to allow for the electrical contacting. End faces 410, in particular the poles at end faces 410, are free of insulating sheathing 430. Electrically non-conductive materials, for example, paper, cardboard, and plastic, are suitable for use as insulating sheathing 430. Insulating sheathing 430 forms, in particular, a thin sleeve which rests closely on lateral surface 405.

In addition to the described and illustrated specific embodiments, further specific embodiments are conceivable, which may include further modifications and combinations of features.

What is claimed is:
1. A method for manufacturing a rechargeable battery pack, the method comprising:
providing a cell holder and at least two battery cells, wherein the cell holder includes sleeve-shaped insulating walls, between which cylindrical cell openings for accommodating the battery cells are located; and pressing the battery cells into the cell openings so as to provide a force-fit connection between the cell holder and the battery cells, wherein the cell holder is preheated before the pressing.

2. The method of claim 1, wherein, after the battery cells are pressed into the cell openings, the cell holder rests on the battery cells in an area of the cell openings in a gap-free manner.

3. The method of claim 1, wherein a diameter of the cell openings before the pressing of the battery cells into the cell openings is between 97% and 99% of a diameter of a corresponding battery cell of the battery cells.

4. The method of claim 1, wherein a circumference of the cell openings before the pressing of the battery cells into the cell openings is between 97% to 99.5% of a circumference of a cell casing.

5. The method of claim 1, wherein a diameter of the cell openings before the pressing of the battery cells into the cell openings is between 0.10 mm and 0.15 mm less than a diameter of a corresponding battery cell of the battery cells.

6. The method of claim 1, wherein the cell holder is made up of a plastic material, a thermosetting plastic, or an elastomer.

7. The method of claim 6, wherein the elastomer includes a polyethylene having a density between 0.90 g/cm$^3$ and 1.0 g/cm$^3$.

8. The method of claim 1, wherein the cell holder is preheated before the pressing to a temperature between 60° C. and 110° C.

9. The method of claim 1, wherein a material expansion occurs in the cell holder after the battery cells have been pressed into the cell openings, the material expansion being between 0.2% and 5%.

10. The method of claim 1, wherein after the battery cells are pressed into the cell openings, a cell holding force acts between the cell holder and the battery cells, the cell holding force being between 20 N and 400 N.

11. The method of claim 1, wherein a diameter of the cell openings before the pressing of the battery cells into the cell openings is between 97.5% and 98.5% of a diameter of a corresponding battery cell of the battery cells.

12. The method of claim 1, wherein a circumference of the cell openings before the pressing of the battery cells into the cell openings is between 98% to 99% of a circumference of a cell casing.

13. The method of claim 1, wherein a diameter of the cell openings before the pressing of the battery cells into the cell openings is between 0.10 mm and 0.15 mm less than a diameter of a corresponding battery cell of the battery cells.

14. The method of claim 1, wherein the cell holder is made up of a plastic material, including a thermoplastic polymer, a thermosetting plastic, or an elastomer, including a polyethylene.

15. The method of claim 14, wherein the polyethylene has a density between 0.95 g/cm$^3$ and 0.99 g/cm$^3$.

16. The method of claim 14, wherein the polyethylene has a density between 0.96 g/cm$^3$ and 0.98 g/cm$^3$.

17. The method of claim 1, wherein the cell holder is preheated before the pressing to a temperature between 70° C. and 80° C.

18. The method of claim 1, wherein a material expansion occurs in the cell holder after the battery cells have been pressed into the cell openings, the material expansion being between 0.5% and 3%.

19. The method of claim 1, wherein a material expansion occurs in the cell holder after the battery cells have been pressed into the cell openings, the material expansion being between 1% and 2%.

20. The method of claim 1, wherein after the battery cells are pressed into the cell openings, a cell holding force acts between the cell holder and the battery cells, the cell holding force being between 100 N and 300 N.

21. The method of claim 1, wherein after the battery cells are pressed into the cell openings, a cell holding force acts between the cell holder and the battery cells, the cell holding force being between 150 N and 250 N.

22. The method of claim 1, wherein the cell holder and the at least two battery cells are electrically connected to each other with corresponding cell connectors in a parallel circuit and/or a series circuit.

23. The method of claim 1, wherein the battery cells are pressed into the cell openings so as to provide a form-locked connection between the cell holder and the battery cells.

24. The method of claim 1, wherein the rechargeable battery pack is for a hand-held power tool.

* * * * *